US012025282B1

(12) United States Patent
Xie

(10) Patent No.: US 12,025,282 B1
(45) Date of Patent: Jul. 2, 2024

(54) OMNIDIRECTIONAL BENDING LIGHT SOURCE SYSTEM AND LIGHT STRIP

(71) Applicant: General Lighting Electronic Co., Ltd., Zhongshan (CN)

(72) Inventor: Jiuhuai Xie, Loudi (CN)

(73) Assignee: General Lighting Electronic Co., Ltd., Zhongshan (CN)

( * ) Notice: Subject to any disclaimer, the term of this patent is extended or adjusted under 35 U.S.C. 154(b) by 0 days.

(21) Appl. No.: 18/452,135

(22) Filed: Aug. 18, 2023

(30) Foreign Application Priority Data

Jul. 20, 2023 (CN) ......................... 202310898181.3

(51) Int. Cl.
*F21S 4/26* (2016.01)
*F21Y 103/10* (2016.01)
*F21Y 115/10* (2016.01)

(52) U.S. Cl.
CPC ............ *F21S 4/26* (2016.01); *F21Y 2103/10* (2016.08); *F21Y 2115/10* (2016.08)

(58) Field of Classification Search
CPC ..... F21S 4/26; F21Y 2103/10; F21Y 2115/10; H05K 1/189; H05K 1/0278; H05K 1/147
See application file for complete search history.

(56) References Cited

U.S. PATENT DOCUMENTS

2014/0091335 A1* 4/2014 Satake ...................... F21S 4/24 257/88
2015/0354797 A1* 12/2015 Luo ...................... F21V 23/005 174/254
2018/0209604 A1* 7/2018 Kim ...................... H01L 33/647
2019/0113189 A1* 4/2019 Bukkems ............... H05K 1/118
2019/0211980 A1* 7/2019 Pan ......................... F21S 8/035
2020/0318826 A1* 10/2020 Choi ...................... H05K 1/056

* cited by examiner

*Primary Examiner* — Abdulmajeed Aziz
*Assistant Examiner* — Jessica M Apenteng
(74) *Attorney, Agent, or Firm* — Birchwood IP

(57) ABSTRACT

The present invention discloses an omnidirectional bending light source system and light strip including a strip-shaped PCB and a plurality of LED chips, the PCB comprises an interconnected first bend and a second bend, and an angle A is formed therebetween; a first notch is on the first bend, while a second notch is on the second bend, wherein the first notch and the second notch are in an alternating arrangement uniformly along a longitudinal direction of the PCB; the plurality of LED chips are mounted on the first bend or the second bend, wherein at least one of the LED chips is located between the adjacent first and second notches; regardless of the direction in which the PCB is twisted, the angle allows a sufficient room for deformation, thereby ensuring that the electronic components and LED chips mounted on the PCB remain undamaged even during arbitrary bending or twisting.

8 Claims, 4 Drawing Sheets

OMNIDIRECTIONAL BENDING LIGHT SOURCE SYSTEM AND LIGHT STRIP

FIELD OF INVENTION

The present invention relates to the field of lighting technology, in particular to an omnidirectional bending light source system and light strip.

BACKGROUND OF THE INVENTION

Commonly, a PCB board is used in neon light strips due to its rigidity and hardness. However, the conventional neon light strips can only be bent up and down, and slightly sideways left and right, which can hardly be twisted at will to realize 360° all-around bending, so users have a limitation in using them; and the conventional neon light strips are easily damaged by the external tensile force, especially when they are installed at a high height that needs to be suspended, causing the damage rate to be extremely high due to the weight of the strips themselves, which is not small, thus not easy to install and use.

SUMMARY OF THE INVENTION

An object of the present invention is to solve at least one of the technical problems existing in the prior art and to provide an omnidirectional bending light source system and a light strip which can be twisted at will and is not easily damaged by external tensile force.

The omnidirectional bending light source system according to an embodiment of the first aspect of the present invention comprises: a strip-shaped PCB board and a plurality of LED chips, said PCB board comprises an interconnected first bend and a second bend, and an angle A is formed therebetween; a first notch is disposed on the first bend, while a second notch is disposed on the second bend, wherein the first notch and the second notch are in an alternating arrangement uniformly along a longitudinal direction of the PCB board; and the plurality of LED chips are mounted on the first bend or the second bend, wherein at least one of the LED chips is located between the adjacent first and second notches.

According to some embodiments of the present invention, 80°≤ angle A≤120°.

According to some embodiments of the present invention, the angle A is 90°.

According to some embodiments of the present invention, the first notch and/or the second notch extend to the junction of the first bend with the second bend.

According to some embodiments of the present invention, the first notch and/or the second notch are perpendicular to the line connecting the first bend to the second bend, respectively.

A light strip according to an embodiment of the second aspect of the present invention, comprising the omnidirectional bending light source system as described in any one of the preceding subparagraphs, a flexible light-transmitting lamp, and a flexible reinforcing member, wherein the flexible light-transmitting lamp is provided with a mounting groove and a perforation therethrough in a longitudinal direction thereof; wherein the omnidirectional bending light source system is inserted into the mounting groove and the flexible reinforcing member is threaded through the perforation.

According to some embodiments of the present invention, the mounting groove comprises a first mounting groove and a second mounting groove communicating with each other and forming an angle B therebetween, and the angle B is equal in magnitude to the angle A; wherein the first bend is inserted into the first mounting groove and the second bend is inserted into the second mounting groove.

According to some embodiments of the present invention, the flexible light-transmitting lamp comprises a flexible lamp housing having an opening and a flexible light-transmitting portion, wherein the light-transmitting portion is provided with a first recess and a second recess on the inner wall thereof, which respectively pass through the two ends of the light-transmitting portion and communicate with each other, and the angle B is formed between the first recess and the second recess; wherein the light-transmitting portion seals the opening of the lamp housing such that the first mounting groove is formed between the first recess and the lamp housing, the second mounting groove is formed between the second recess and the lamp housing, and the perforation is provided on the light-transmitting portion.

According to some embodiments of the present invention, the inner wall of the first recess or the second recess is provided with an uneven texture relative to the LED chip.

According to some embodiments of the present invention, the flexible light-transmitting lamp is provided with a plug at each end, an alignment hole is provided in the plug at one of the ends, and a wire is electrically connected to the PCB board and then extends out through the alignment hole.

The omnidirectional bending light source system and light strip according to the embodiment of the present invention have at least the following beneficial effects: since the first notch and the second notch are arranged in an alternating arrangement uniformly along a longitudinal direction of the PCB board, regardless of the direction in which the PCB board is bent, the first notch and the second notch will provide a room for extension and contraction; and since the angle A is formed between the first bend and the second bend, regardless of the direction in which the PCB board is twisted, the angle between the first bend and the second bend will provide a room for deformation; thereby ensuring that the electronic components and LED chips mounted on the PCB board remain undamaged even during arbitrary bending or twisting. In addition, the flexible reinforcing member increases the tensile strength of the light strip to prevent the light strip from being damaged and allows it to be arbitrarily bent and twisted with the light strip.

Additional aspects and advantages of the present invention will be given, in part, as will become apparent from the following description, or as will be learned through the practice of the present invention.

BRIEF DESCRIPTION OF THE DRAWINGS

Specific embodiments of the present invention will be further described below in connection with the accompanying drawings.

DETAILED DESCRIPTION OF THE PREFERRED EMBODIMENTS

Figure 1:
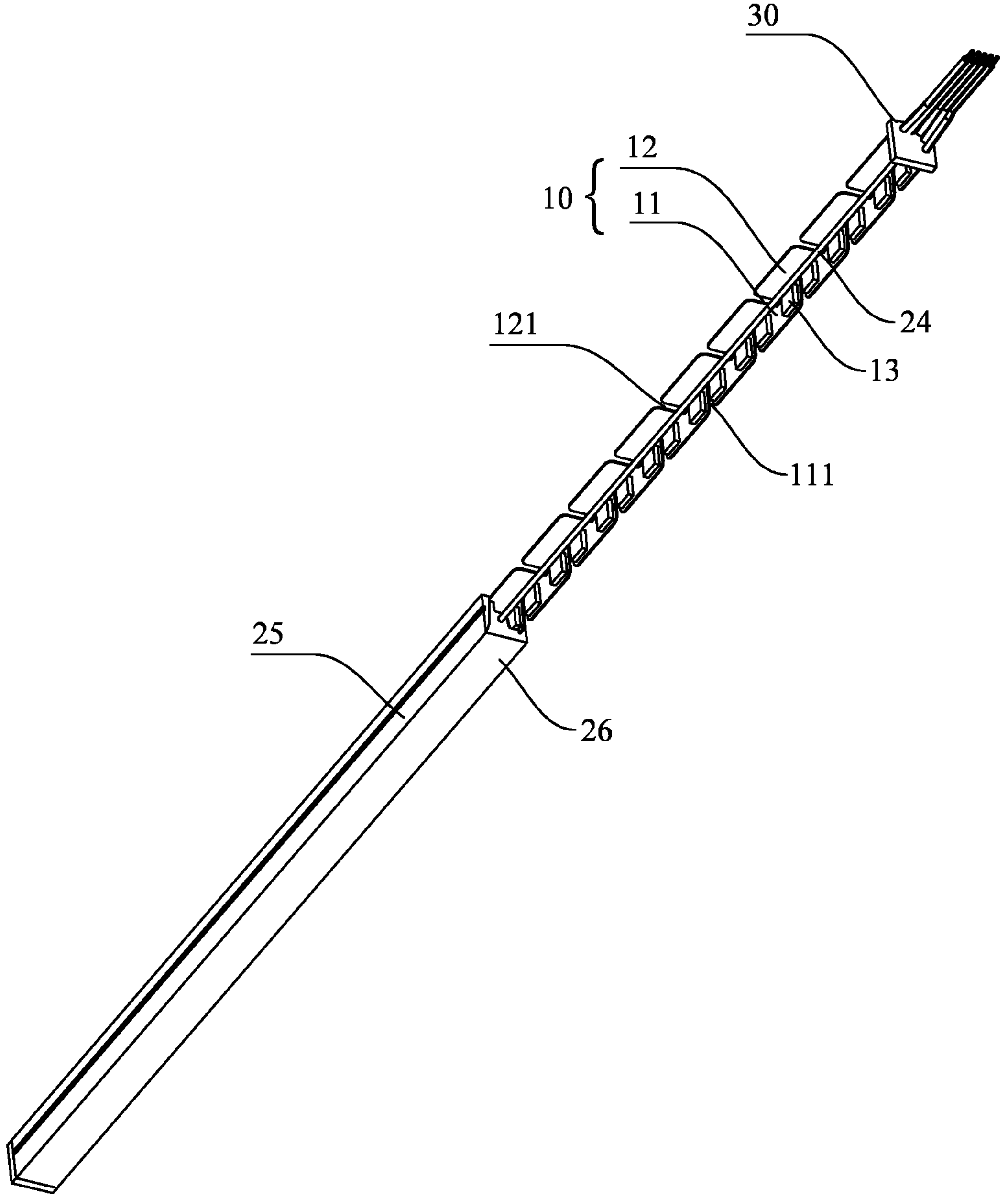
FIG. 1 is an exploded structural view thereof of a light strip.

This section will describe in detail the specific embodiments of the present invention, the preferred embodiments of the present invention are shown in the accompanying drawings, and the role of the accompanying drawings is to supplement the description of the specification so that people can intuitively and graphically understand each technical feature of the present invention and the overall technical solutions, but it cannot be construed as limiting the scope of protection of the present invention.

In the description of the present invention, it should be understood that orientation descriptions such as up, down, front, rear, left, right, and the like, which refer to orientation or positional relationships indicated as being based on those shown in the accompanying drawings, are intended only to facilitate the description of the present invention and to simplify the description, and do not indicate or suggest that the device or element referred to must have a particular orientation, be constructed and operated with a particular orientation, and therefore should not be construed as a limitation of the present invention.

In the description of the present invention, the meaning of a number is one or more, the meaning of a plurality is more than two, greater than, less than, more than, etc. is understood to exclude the present number, and above, below, within, etc. is understood to include the present number. If there is a description to the first, the second is used only to distinguish technical features and is not to be understood as indicating or implying relative importance or implicitly specifying the number of technical features indicated or implicitly specifying the sequential relationship of the technical features indicated.

Referring to FIGS. 1 to 4, the omnidirectional bending light source system according to an embodiment of the first aspect of the present invention comprises a strip-shaped PCB board 10 and a plurality of LED chips 13, said PCB board comprising an interconnected first bend 11 and a second bend 12, and an angle A is formed therebetween; a first notch 111 is disposed on the first bend 11, while a second notch 121 is disposed on the second bend 12, wherein the first notch 111 and the second notch 121 are arranged in an alternating arrangement uniformly along a longitudinal direction of the PCB board 10; and the plurality of LED chips 13 are mounted on the first bend 11 or the second bend 12, wherein at least one of the LED chips 13 is located between the adjacent first notch 111 and second notch 121; preferably, 80°≤angle A≤120°; in some embodiments, the angle A is 90° such that the first bend 11 and the second bend 12 are perpendicular to each other, resulting in an L-shaped cross-section of the PCB board 10; since the first notch 111 and the second notch 121 are arranged in an alternating arrangement uniformly along a longitudinal direction of the PCB board 10, regardless of the direction in which the PCB board 10 is bent, the first notch 111 and the second notch 121 will provide a room for extension and contraction; and since the angle of 90° is formed between the first bend 11 and the second bend 12, regardless of the direction in which the PCB board 10 is twisted, the angle of 90° between the first bend 11 and the second bend 12 will provide a larger room for deformation; thereby ensuring that the electronic components and LED chips mounted on the PCB board 10 remain undamaged even during arbitrary bending or twisting; when the angle A is 80°, the deformation room between the first bend 11 and the second bend 12 is smaller than the deformation room at angle of 90°, but it can still accommodate the twisting deformation; and when the angle A is 120°, the deformation room between the first bend 11 and the second bend 12 is larger than the deformation room at angle of 90°, but its twisting flexibility is not as good as that at angle of 90°.

Figure 2:
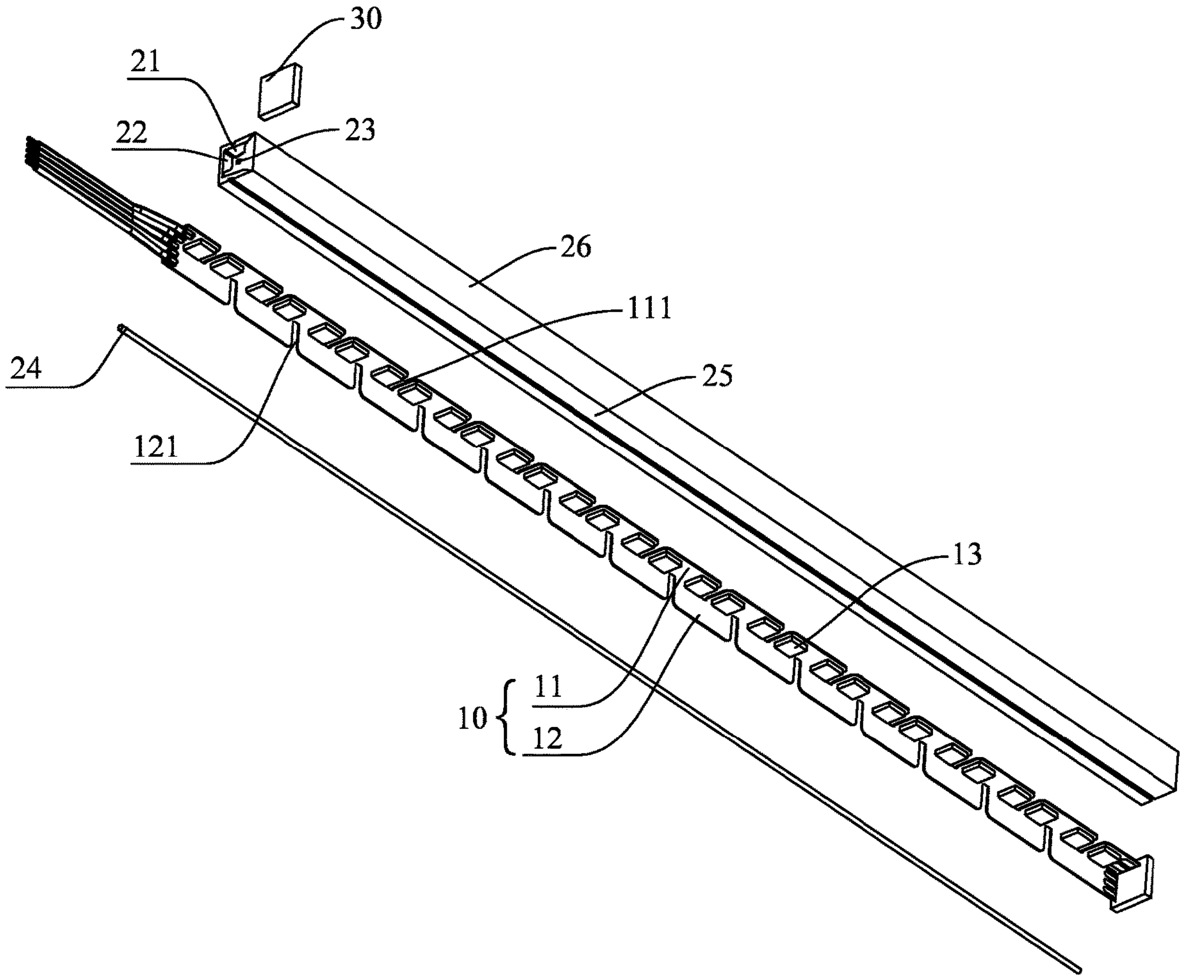
FIG. 2 is a second exploded structural view thereof of the light strip.

As shown in FIGS. 1 and 2, the first notch 111 and the second notch 121 extend to the junction of the first bend 11 and the second bend 12, regardless of the direction in which the PCB board 10 is bent, the first notch 111 and the second notch 121 provide a larger room for extension and contraction.

In some embodiments, one of the first notch 111 and the second notch 121 extends to the junction of the first bend 11 and the second bend 12, regardless of the direction in which the PCB board 10 is bent, the first notch 111 and the second notch 121 provide extension and contraction room, wherein the longer the notch, the greater the extension and contraction room provided.

In some embodiments, the first notch 111 and the second notch 121 are perpendicular to the line connecting the first bend 11 and the second bend 12, respectively, regardless of the direction in which the PCB board 10 is bent, the first notch 111 and the second notch 121 provide a larger extension and contraction room.

In some embodiments, one of the first notch 111 and the second notch 121 is perpendicular to the line connecting the first bend 11 and the second bend 12, regardless of the direction in which the PCB board 10 is bent, the first notch 111 and the second notch 121 provide an extension and contraction room, wherein the higher the perpendicularity of the first notch 111, the second notch 121, the larger the extension and contraction room provided.

A light strip according to an embodiment of the second aspect of the present invention, comprising the above-mentioned omnidirectional bending light source system, a flexible light-transmitting lamp, and a flexible reinforcing member 24, wherein the flexible light-transmitting lamp is provided with a mounting groove and a perforation 23 therethrough in a longitudinal direction thereof, the omnidirectional bending light source system is inserted into the mounting groove, and the flexible reinforcing member 24 is threaded through the perforation 23; the mounting groove comprises a first mounting groove 21 and a second mounting groove 22 communicating with each other and form a 90° angle therebetween; wherein the first bend 11 is inserted into the first mounting groove 21 and the second bend 12 is inserted into the second mounting groove 22; by the flexible reinforcing member 24, it increases the tensile strength of the light strip to prevent the light strip from being damaged, and allows the flexible reinforcing member 24 to be arbitrarily bent and twisted with the light strip.

In some embodiments, the flexible reinforcing member 24 is a steel wire rope; the 1.2 mm diameter wire rope has a lifting weight of about 100-150 KG, and the conventional light strip can be twisted 1 turn for 1 meter, whereas the light strip of the present invention can be twisted more than 5 turns for 1 meter and is capable of being bent at will.

Figure 3:
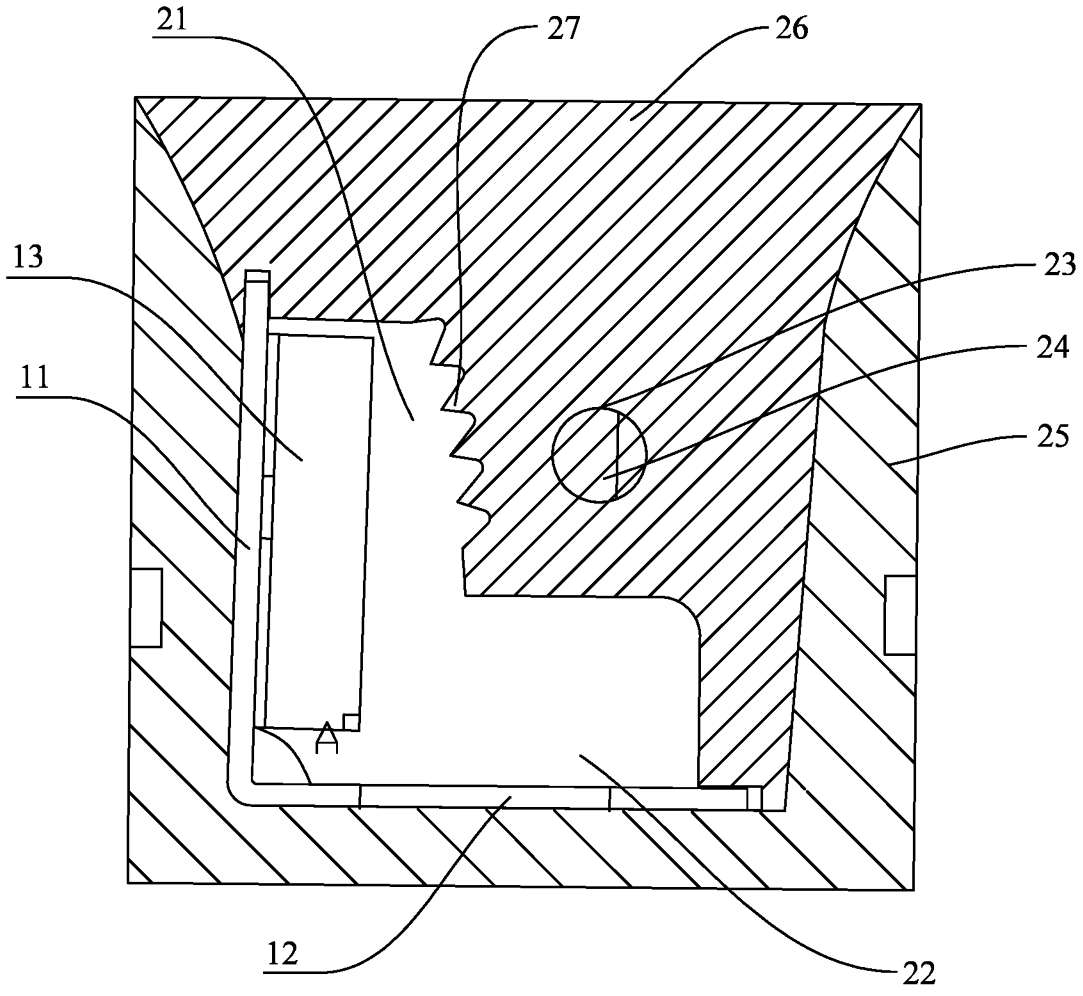
FIG. 3 is a cross-sectional view of the light strip.
Figure 4:
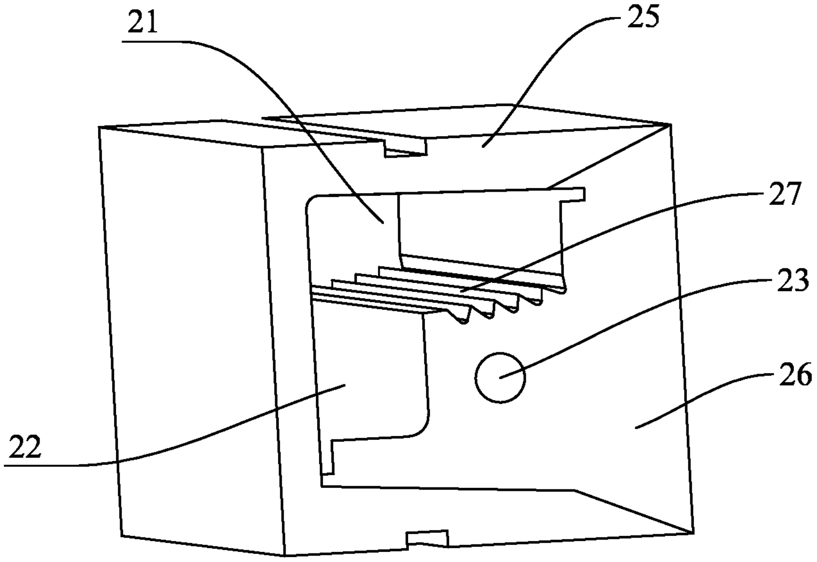
FIG. 4 is a structural view of a lamp housing.

As shown in FIGS. 3 and 4, the flexible light-transmitting lamp comprises a flexible U-shaped lamp housing 25 and a flexible light-transmitting portion 26, wherein the lamp housing 25 and the light-transmitting portion 26 are made of flexible materials such as silicone or plastic, respectively, and the light-transmitting portion 26 is made of a transparent material; wherein the light-transmitting portion 26 is provided with a first recess and a second recess on the inner wall thereof, which respectively pass through the two ends of the light-transmitting portion 26 and communicate with each other, and an angle between the first recess and the second recess is 90°; wherein the light-transmitting portion 26 seals the opening of the lamp housing 25 such that the first mounting groove 21 is formed between the first recess and the lamp housing 25, the second mounting groove 22 is formed between the second recess and the lamp housing 25, and the perforation 23 is provided on the light-transmitting portion 26; overall, the structure is simple and it is convenient for the PCB board 10 to be assembled with the lamp body.

In some embodiments, the first recess or the second recess is provided with an uneven texture 27 on the inner wall relative to the LED chip 13, and a light-diffusing material is provided in the light-transmitting portion 26, so that the light is uniformly emitted through the reflection of the light-diffusing material and the uneven texture 27 on the side wall, giving the product with a favorable soft-lighting feature.

As shown in FIGS. 1 and 2, the flexible light-transmitting lamp is provided with a plug 30 at each end, an alignment hole is provided in the plug 30 at one of the ends, and a wire is electrically connected to the PCB board 10 and then extends out through the alignment hole, thereby completing the assembly of the entire product.

It will readily be appreciated by those skilled in the art that the above preferred methods can be freely combined and superimposed without conflict.

The foregoing is only a preferred embodiment of the present invention and is not intended to limit the scope of the present invention, and all equivalent structural transformations made by utilizing the contents of the specification of the present invention and the accompanying drawings under the inventive concept of the present invention, or utilized directly or indirectly in other related fields of technology, are all included within the scope of the patent protection of the present invention.

What is claimed is:

1. A light strip comprising a flexible light-transmitting lamp, a flexible reinforcing member, and an omnidirectional bending light source system, comprising:

a strip-shaped PCB board, comprising an interconnected first bend and a second bend, and an angle A is formed therebetween; a first notch is disposed on the first bend, while a second notch is disposed on the second bend; wherein the first notch and the second notch are arranged in an alternating arrangement uniformly along a longitudinal direction of the PCB board; and a plurality of LED chips, mounted on the first bend or the second bend, wherein at least one of the LED chips is located between the adjacent first notch and second notch, wherein the flexible light-transmitting lamp is provided with a mounting groove and a perforation therethrough in a longitudinal direction thereof; the mounting groove comprises a first mounting groove and a second mounting groove communicating with each other and forming an angle B therebetween, and the angle B is equal in magnitude to the angle A; the omnidirectional bending light source system is inserted into the mounting groove, the first bend is inserted into the first mounting groove, the second bend is inserted into the second mounting groove, and the flexible reinforcing member is threaded through the perforation.

2. The light strip according to claim 1, wherein: the flexible light-transmitting lamp comprises a flexible lamp housing having an opening and a flexible light-transmitting portion, wherein the light-transmitting portion is provided with a first recess and a second recess on an inner wall thereof, which respectively pass through two ends of the light-transmitting portion and communicate with each other, and the angle B is formed between the first recess and the second recess; wherein the light-transmitting portion seals the opening of the lamp housing such that the first mounting groove is formed between the first recess and the lamp housing, the second mounting groove is formed between the second recess and the lamp housing, and the perforation is provided on the light-transmitting portion.

3. The light strip according to claim 2, wherein: the inner wall of the first recess or the second recess is provided with an uneven texture relative to the LED chip.

4. The light strip according to claim 1, wherein: the flexible light-transmitting lamp is provided with a plug at each end, an alignment hole is provided in the plug at one of the ends, and a wire is electrically connected to the PCB board and then extends out through the alignment hole.

5. The light strip of claim 1, wherein: 80°≤ angle A≤120°.

6. The light strip of claim 1, wherein: the angle A is 90°.

7. The light strip of claim 1, wherein: the first notch and/or the second notch extend to the junction of the first bend with the second bend.

8. The light strip of claim 1, wherein: the first notch and/or the second notch are perpendicular to the line connecting the first bend to the second bend.

* * * * *